March 19, 1929.   B. J. GOLDSMITH ET AL   1,706,027
WINDOW CONSTRUCTION
Filed April 14, 1925
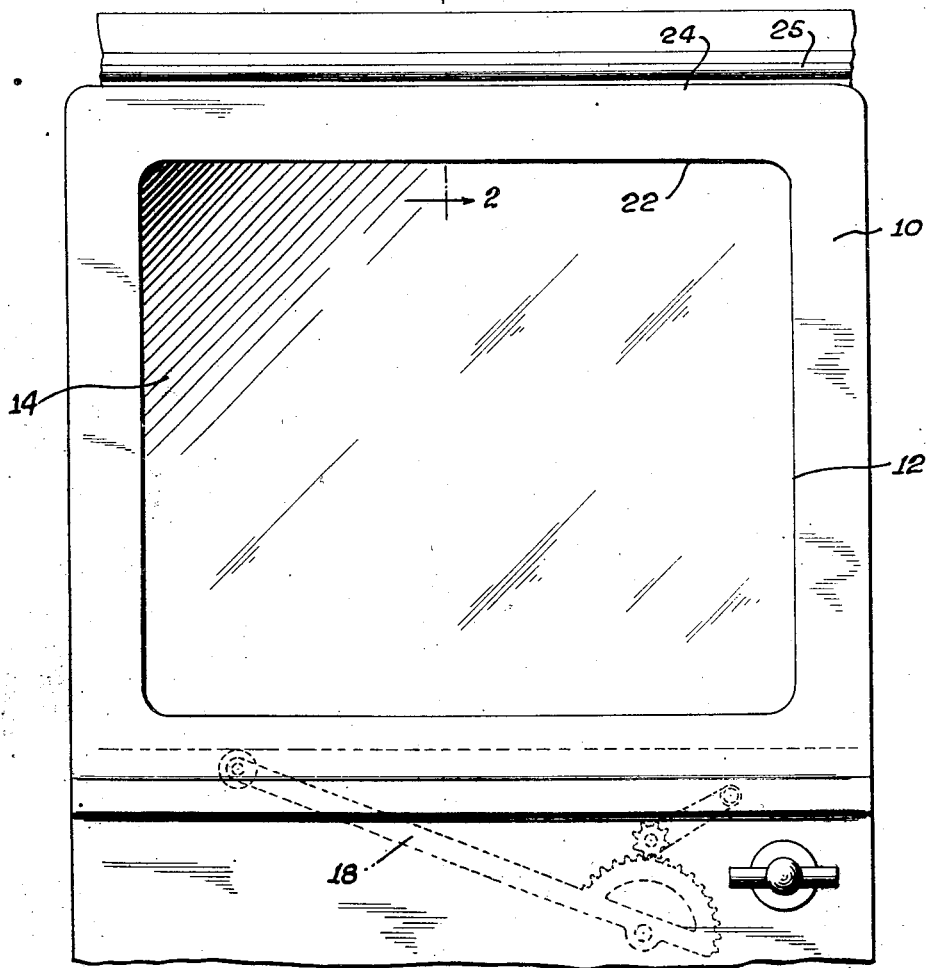
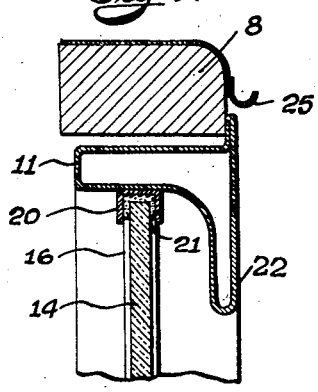 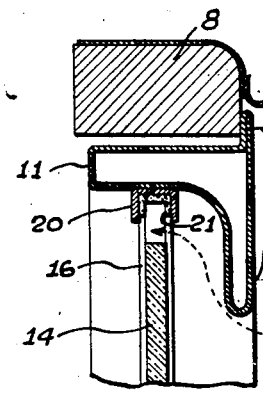
INVENTORS
Bertram J. Goldsmith.
Emil Koeb.
BY Townsend & Decker
ATTORNEYS.

Patented Mar. 19, 1929.

1,706,027

UNITED STATES PATENT OFFICE.

BERTRAM J. GOLDSMITH, OF NEW YORK, AND EMIL KOEB, OF TUCKAHOE, NEW YORK, ASSIGNORS, BY MESNE ASSIGNMENTS, TO THE ENGLISH & MERSICK COMPANY, OF NEW HAVEN, CONNECTICUT, A CORPORATION OF CONNECTICUT.

WINDOW CONSTRUCTION.

Application filed April 14, 1925. Serial No. 22,963.

This invention relates to improvements in window constructions.

It is a primary object of the invention to provide an improved mounting for a closure so arranged that the interior of the vehicle or other structure upon which the window is mounted can be properly ventilated in any kind of weather.

Another object is to so construct the ventilating means as not to add materially to the cost thereof.

A still further object is to so arrange the ventilating opening that it can be entirely closed when desired without the addition of any supplemental moving parts.

Other and more specific objects will appear from the following description.

In the drawings:

Fig. 1 is an elevational view of a portion of an automobile door showing our invention applied thereto.

Fig. 2 is a section on the line 2—2 of Fig. 1.

Fig. 3 is a section on the same line showing the closure moved to a different position.

Referring to the details of the drawings:

There is shown a portion of the automobile frame 8 on which is mounted a swinging door 10 to which we have applied our invention. The door member 10 in the construction shown is formed with a transverse hollow frame member 11 above the window opening 12, the frame part 10 carrying the movable closure 14 shown as a section of plate glass. The closure is adapted to entirely close the window opening 12 or to be lowered into the window well as is usual in devices of this type. Any preferred form of window guides 16 and window regulator 18 may be employed as the details thereof form no part of our present invention.

The upper transverse frame member 11 carries an inverted channel 20 forming a closing pocket and which may be suitably interlined with felt or other material as shown at 21 to receive the window glass 14 when the window is in closed position. In order to permit the window to be opened to a slight extent in damp or otherwise inclement weather the top frame member 11 has formed on the outer face thereof a depending shield member 22 formed preferably as an integral part thereof. This flange 22 extends below the upper part of the opening 12 sufficiently to permit the window to be opened to the position shown in Fig. 3 without danger of rain or snow passing into the interior of the vehicle. It is sufficiently spaced from the plane in which the window moves to permit air to freely enter the opening with the window in the position shown in Fig. 3.

The frame member 11 may include the abutment flange 24 formed integrally with the said frame member. The protecting drain trough 25 is preferably secured to the body part 8 in position to protect the door and in particular the opening shielded by the flange or shield member 22.

It will be seen that by the above construction the window 14 may be moved to position shown in Fig. 3 in any usual weather in order to properly ventilate the interior of the vehicle without discomfort to the occupants of the vehicle. However, if in extremely cold or wet weather, or for any other reason, it is desired to entirely close the window opening, this can be accomplished without the use of any auxiliary moving parts.

While we have shown and described certain specific constructions, it is to be understood that these are in no way to be considered the limits of the invention but that the spirit and scope of the invention are set forth in the appended claims.

It is obvious that instead of forming the protecting shield 22 as an integral part of the door frame, it may be made as a separate part secured to the door. Furthermore the invention is not limited to use upon closed automobiles but it may be used in other relations without departing from the spirit of the invention.

We claim as our invention:

1. In a vehicle door, a metallic frame provided with an opening and with a hollow upper cross member formed of sheet metal and extending across said door, said cross member being formed adjacent the lower edge thereof with window receiving means and terminating in a hollow depending shield member adjacent the outer face thereof and positioned beneath the body of the cross member and within the plane of said door, a closure for said opening, and means for slidably supporting said closure in spaced relation to said shield member.

2. In a vehicle door, a metallic frame provided with an opening and with an upper cross member extending across said door, said cross member being formed with an upwardly extending abutment flange and with an integral depending shield member, said flange and shield member being positioned adjacent the outer face of said door and forming a substantially unbroken outer surface for said door extending from the top of said flange to the bottom of said shield member, said shield member being positioned within the plane of said door, a transparent closure, and means for supporting and moving said closure in spaced relation to said shield member.

3. In combination with a body including a framework providing an opening for a window, a depending shield arranged on the outer surface of said framework, said shield being extended below the upper edge of said opening and then turned inwardly and upwardly adjacent to the upper edge of said opening.

Signed at New York in the county of New York and State of New York this 13th day of April A. D. 1925.

BERTRAM J. GOLDSMITH.
EMIL KOEB.